(12) United States Patent
Kim et al.

(10) Patent No.: US 9,937,784 B2
(45) Date of Patent: Apr. 10, 2018

(54) AUXILIARY FUEL TANK FOR FLEXIBLE FUEL VEHICLE

(71) Applicant: Hyundai Motor Company, Seoul (KR)

(72) Inventors: Jong Ki Kim, Gyeonggi-do (KR); Chang Han Kim, Gwangju (KR); Jae Min Lee, Chungcheongnam-do (KR)

(73) Assignee: Hyundai Motor Company, Seoul (KR)

( * ) Notice: Subject to any disclaimer, the term of this patent is extended or adjusted under 35 U.S.C. 154(b) by 76 days.

(21) Appl. No.: 15/213,671

(22) Filed: Jul. 19, 2016

(65) Prior Publication Data

US 2017/0144536 A1 May 25, 2017

(30) Foreign Application Priority Data

Nov. 24, 2015 (KR) .................. 10-2015-0164685

(51) Int. Cl.
*B01D 53/04* (2006.01)
*F02M 25/08* (2006.01)
(Continued)

(52) U.S. Cl.
CPC .... *B60K 15/03504* (2013.01); *B01D 53/0407* (2013.01); *B01D 53/0415* (2013.01); *B60K 15/03006* (2013.01); *B60K 15/0406* (2013.01); *B60K 15/063* (2013.01); *F02M 25/0854* (2013.01); *F02M 25/0872* (2013.01); *B01D 2253/102* (2013.01); *B01D 2257/702* (2013.01); *B01D 2259/4516* (2013.01); *B01D 2259/4566* (2013.01); *B60K 2015/03072* (2013.01); *B60K 2015/03118* (2013.01);
(Continued)

(58) Field of Classification Search
CPC ............ B01D 53/0407; B01D 53/0415; B01D 2253/102; B01D 2259/4516; B01D 2259/4566; F02M 25/0854; F02M 25/0872; B60K 15/30006; B60K 15/3504; B60K 15/0406; B60K 15/063; B60K 2015/03072; B60K 2015/03118; B60K 2015/03236; B60K 2015/03309; B60K 2015/03355; B60K 2015/03523; B60K 2015/0432; B60K 2015/0634; B60K 2015/0637; B60K 2015/0638
USPC .............. 96/108, 147; 95/146; 123/518, 519
See application file for complete search history.

(56) References Cited

U.S. PATENT DOCUMENTS

| 4,478,239 A | 10/1984 | Nagashima |
| 4,701,198 A * | 10/1987 | Uranishi ............ B01D 19/0063 |
| | | 123/519 |

(Continued)

FOREIGN PATENT DOCUMENTS

| JP | 2007-255386 A | 10/2007 |
| JP | 2008-050990 A | 3/2008 |

(Continued)

*Primary Examiner* — Frank Lawrence
(74) *Attorney, Agent, or Firm* — Mintz Levin Cohn Ferris Glovsky and Popeo, P.C.; Peter F. Corless

(57) ABSTRACT

An auxiliary fuel tank for a flexible fuel vehicle is provided. The auxiliary fuel tank is mounted to an auxiliary tank body for storing gasoline fuel and is installed in an engine compartment of a flexible fuel vehicle. The auxiliary fuel tank includes a canister that is coupled to the auxiliary tank body and has activated carbon therein. The canister is configured to collect fuel evaporation gas generated in the auxiliary tank body to supply fuel components to an engine.

6 Claims, 2 Drawing Sheets

(51) Int. Cl.
  *B60K 15/035* (2006.01)
  *B60K 15/04* (2006.01)
  *B60K 15/063* (2006.01)
  *B60K 15/03* (2006.01)

(52) U.S. Cl.
  CPC ............ *B60K 2015/03236* (2013.01); *B60K 2015/03309* (2013.01); *B60K 2015/03355* (2013.01); *B60K 2015/03523* (2013.01); *B60K 2015/0432* (2013.01); *B60K 2015/0634* (2013.01); *B60K 2015/0637* (2013.01); *B60K 2015/0638* (2013.01)

(56) References Cited

U.S. PATENT DOCUMENTS

| | | | |
|---|---|---|---|
| 6,003,499 A * | 12/1999 | Devall | F02M 25/0836 |
| | | | 123/516 |
| 7,677,277 B2 | 3/2010 | Thompson et al. | |
| 2006/0016436 A1 | 1/2006 | Groom et al. | |
| 2011/0290118 A1* | 12/2011 | Tanaka | B60K 15/03504 |
| | | | 96/139 |

FOREIGN PATENT DOCUMENTS

| | | |
|---|---|---|
| JP | 2013-050047 A | 3/2013 |
| KR | 20-0157191 Y1 | 6/1999 |
| KR | 10-0535586 B1 | 12/2005 |
| KR | 10-2012-0127918 A | 11/2012 |
| KR | 10-1223450 B1 | 1/2013 |
| WO | 2008/006814 A1 | 1/2008 |

\* cited by examiner

AUXILIARY FUEL TANK FOR FLEXIBLE FUEL VEHICLE

CROSS-REFERENCE TO RELATED APPLICATION

This application claims under 35 U.S.C. § 119(a) the benefit of priority to Korean Patent Application No. 10-2015-0164685 filed on Nov. 24, 2015, the entire contents of which are incorporated herein by reference.

BACKGROUND (a) Technical Field

The present disclosure relates to an auxiliary fuel tank for a flexible fuel vehicle, and more particularly, to an auxiliary fuel tank for a flexible fuel vehicle that reduces the manufacturing cost and weight of a vehicle by obviating a venting line which passes through an engine compartment and an underbody of a rear floor.

(b) Background Art

Many vehicles currently being developed are flexible fuel vehicles (FFVs) using ethanol, the main material of which is sugar cane, as a fuel. Ethanol has not been practically used as a fuel of vehicles due to high corrosiveness and fuel system corroded by water contained the ethanol. However, the use of ethanol has increasing researched due to an increase in international oil prices and environmental issues such as exhaust gas regulations, and laws related to the use of fuel containing ethanol for vehicles have been enacted in various countries.

Since ethanol has a higher octane number than gasoline, ethanol vehicles are more powerful than gasoline vehicles but are inefficient due to the low calorific value of ethanol. In addition, since ethanol has a low explosion point, ethanol vehicles may not start normally at temperatures equal to or less than a particular temperature (e.g., about 16° C. to 18° C.). Accordingly, a flexible fuel vehicle using ethanol as a fuel includes an auxiliary fuel tank for storing gasoline fuel to improve the ease of startup during the winter season or colder weather temperatures. The auxiliary fuel tank is mainly installed in an engine compartment in consideration of the ease of injection of gasoline fuel. The pressure in the auxiliary fuel tank installed in the engine compartment may be increased due to the temperature of the engine room. Accordingly, fuel evaporation gas (HC) harmful to the human body may leak out of the auxiliary fuel tank and enter the vehicle interior.

The above information disclosed in this section is merely for enhancement of understanding of the background of the invention and therefore it may contain information that does not form the prior art that is already known in this country to a person of ordinary skill in the art.

SUMMARY

The present invention provides an auxiliary fuel tank for a flexible fuel vehicle, capable of reducing the manufacturing cost and weight of a vehicle by installing a canister, for collecting fuel evaporation gas generated in the auxiliary fuel tank, to the auxiliary fuel tank, by obviating a venting line which passes through an engine compartment and an underbody of a rear floor.

In another aspect, the present invention provides an auxiliary fuel tank for a flexible fuel vehicle configured to collect fuel evaporation gas generated in the auxiliary fuel tank by mounting a compact canister to a fuel cap of the auxiliary fuel tank, thereby eliminating the smell of gasoline fuel stored in the auxiliary fuel tank.

In an exemplary embodiment, an auxiliary fuel tank for a flexible fuel vehicle may be mounted to an auxiliary tank body configured to store gasoline fuel, and installed in an engine compartment of a flexible fuel vehicle. The auxiliary fuel tank may include a canister coupled to the auxiliary tank body, having activated carbon therein, and configured to collect fuel evaporation gas generated in the auxiliary tank body to supply fuel components to an engine. The canister may be integrally connected to a first end of a quick connector when the quick connector is inserted and coupled into a fuel cap of the auxiliary tank body.

The quick connector may be independently coupled to the fuel cap, and a position of the quick connector may be fixed when the quick connector rotates for detachment/attachment of the fuel cap. Particularly, the quick connector may be selectively separated from the fuel cap for maintenance of the canister. A first end of the canister, from which fuel evaporation gas is discharged, may be fixedly inserted into an evaporation gas hose preinstalled in the engine compartment.

BRIEF DESCRIPTION OF THE DRAWINGS

The above and other features of the present invention will now be described in detail with reference to exemplary embodiments thereof illustrated the accompanying drawings which are given hereinbelow by way of illustration only, and thus are not limitative of the present invention, and wherein.

Figure 1:
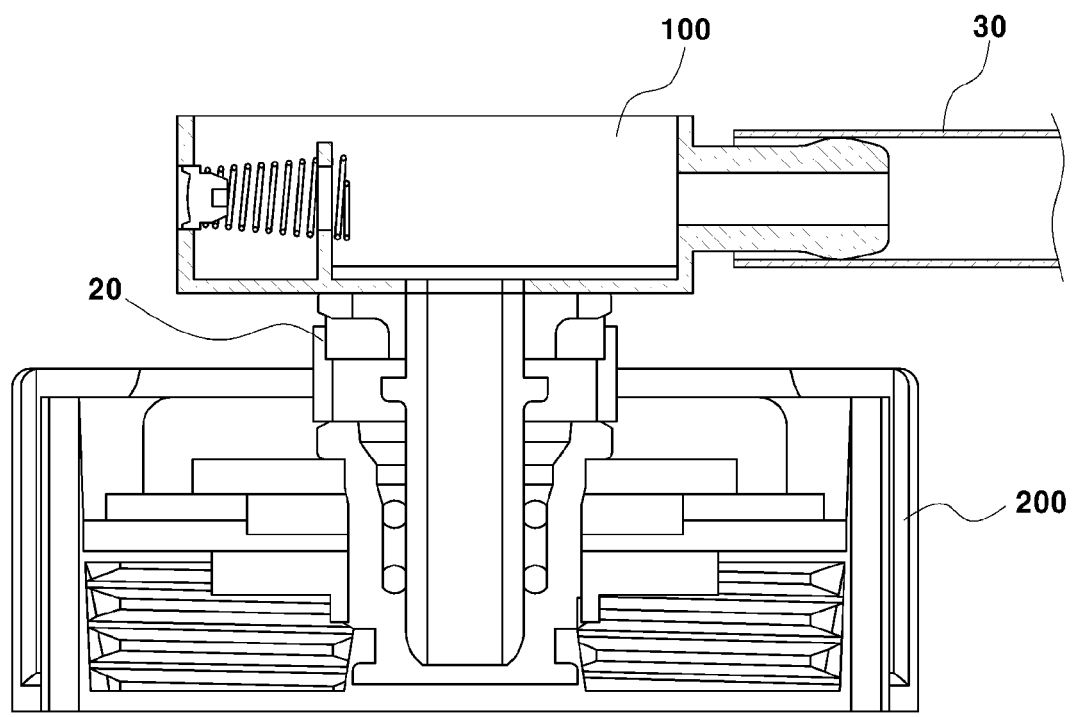
FIG. 1 is a view schematically illustrating an auxiliary fuel tank for a flexible fuel vehicle according to an exemplary embodiment of the present invention.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment. In the figures, reference numbers refer to the same or equivalent parts of the present invention throughout the several figures of the drawing.

DETAILED DESCRIPTION

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, combustion, plug-in hybrid electric vehicles, hydrogen-powered vehicles and other alternative fuel vehicles (e.g. fuels derived from resources other than petroleum).

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

Hereinafter reference will now be made in detail to various exemplary embodiments of the present invention, examples of which are illustrated in the accompanying drawings and described below. While the invention will be described in conjunction with exemplary embodiments, it will be understood that present description is not intended to limit the invention to those exemplary embodiments. On the contrary, the invention is intended to cover not only the exemplary embodiments, but also various alternatives, modifications, equivalents and other exemplary embodiments, which may be included within the spirit and scope of the invention as defined by the appended claims.

Figure 2:
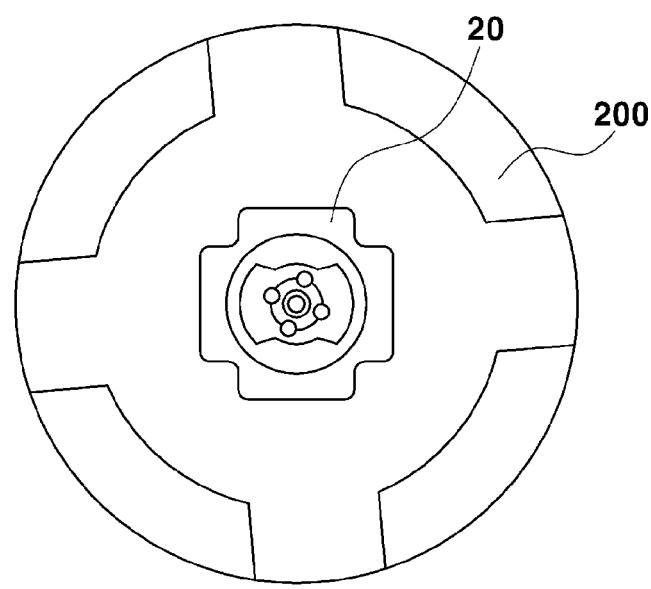
FIG. 2 is a view illustrating a quick connector of the auxiliary fuel tank for a flexible fuel vehicle according to the exemplary embodiment of the present invention.

FIG. 1 is a view schematically illustrating an auxiliary fuel tank for a flexible fuel vehicle according to an exemplary embodiment of the present invention. FIG. 2 is a view illustrating a quick connector of the auxiliary fuel tank for a flexible fuel vehicle according to the exemplary embodiment of the present invention. As illustrated in FIGS. 1 and 2, the auxiliary fuel tank for a flexible fuel vehicle may include a canister 100.

Figure 3:
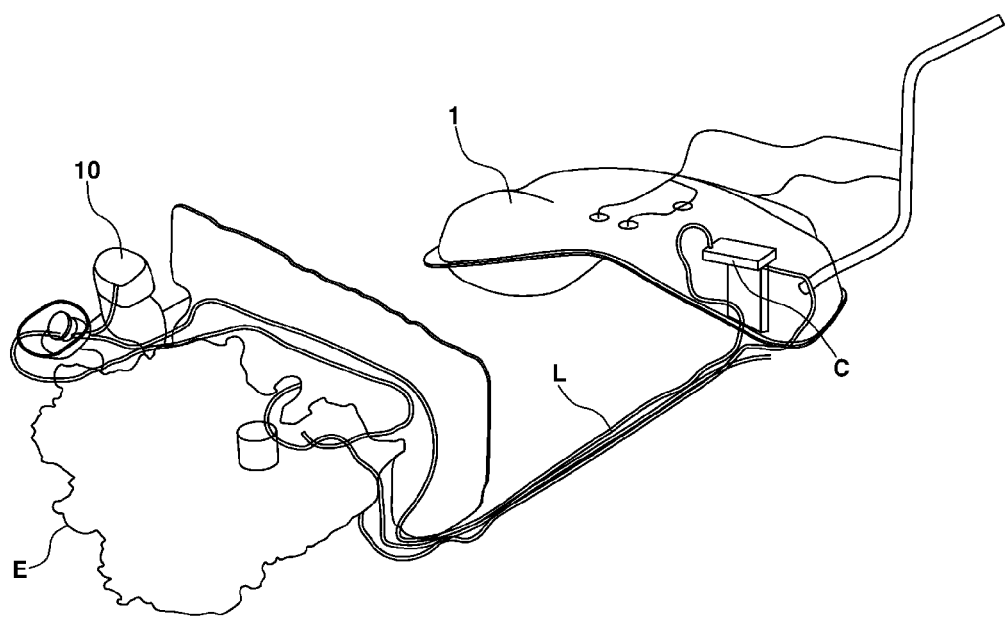
FIG. 3 is a view illustrating a venting line in the auxiliary fuel tank for a flexible fuel vehicle according to the exemplary embodiment of the present invention.

Particularly, a flexible fuel vehicle (FFV) is a vehicle that uses ethanol as a main fuel, and does not start normally at temperatures equal to or less than a particular temperature (e.g., about 16° C. to 18° C.) since ethanol has a low explosion point (see a character reference of FIG. 3). Accordingly, the flexible fuel vehicle includes an auxiliary tank body 10 configured to store gasoline fuel to improve the ease of startup during the winter season or colder temperatures. The auxiliary tank body 10 is installed in an engine compartment in consideration of the ease of injection of gasoline fuel.

Furthermore, the auxiliary tank body 10 has to be connected to a canister (not shown) of a main fuel tank located at the lower portion of the rear floor of the vehicle to purge fuel evaporation gas discharged from the auxiliary tank body 10. In particular, the manufacturing cost and weight of the vehicle increases due to an increase in the number of venting lines. Accordingly, to resolve such a problem, the auxiliary fuel tank for a flexible fuel vehicle according to the exemplary embodiment may include the canister 100 configured to collect fuel evaporation gas generated in the auxiliary tank body 10 to supply fuel components to an engine.

The canister 100 may be coupled to the auxiliary tank body 10, may include activated carbon therein, and may be configured to collect fuel evaporation gas generated in the auxiliary tank body 10. Thus, the canister 100 may effectively eliminate the smell of gasoline fuel stored in the auxiliary tank body 10. In other words, the canister 100 may be integrally connected to a first end of a quick connector 20 in the horizontal direction, when the quick connector 20 is vertically inserted and coupled into a fuel cap 200 of the auxiliary tank body 10.

Accordingly, since the inner space of the canister 100 may communicate with the inner space of the quick connector 20, and the quick connector 20 may be inserted and coupled into the fuel cap 200 for opening and closing the auxiliary tank body 10, the fuel evaporation gas generated in the auxiliary tank body 10 may be moved along the quick connector 20 to the canister 100 to be collected therein. Particularly, the quick connector 20 may be independently coupled to the fuel cap 200, and the position of the quick connector may be fixed when the quick connector rotates for detachment/attachment of the fuel cap 200. Since the connection structure of the quick connector 20 is similar to the structure of typical quick connectors, a detailed description thereof will be omitted.

Moreover, in the rotation and opening/closing of the fuel cap 200 to supply gasoline, when the quick connector 20 is integrally coupled to the fuel cap 200, the quick connector 20 may be configured to rotate along with the rotation of the fuel cap 200. Accordingly, the canister 100 may be separated from an evaporation gas hose 30 which is preinstalled in the engine compartment.

In particular, the evaporation gas hose 30 having a predetermined length may be fixedly installed in the engine compartment, and may form a passage in which the fuel evaporation gas collected in the canister 100 may move to the engine. When both of the quick connector 20 and the canister 100 rotate along with the rotation of the fuel cap 200, an end of the canister 100 inserted into the evaporation gas hose 30 may be separated from the evaporation gas hose 30 by rotational force thereof. Accordingly, by independently installing the quick connector 20, coupled to the canister 100, to the fuel cap 200, the canister 100 may be inserted into and connected to the evaporation gas hose 30, regardless of the rotation of the fuel cap 200.

In addition, since the passage structure in fuel evaporation gas moving along the fuel cap 200 of the auxiliary tank body 10 may be applied to the structure of the quick connector 20, the quick connector 20 may be more easily separated from the fuel cap, and thus the canister 100 may be more easily separated from the fuel cap. Consequently, the maintenance of the canister 100 may be performed more effectively.

Furthermore, since the quick connector 20, integrally coupled to the canister 100, may be vertically inserted into and independently coupled to the fuel cap 200, it may be possible to prevent the fuel cap 200 from misplaced. In other words, the position of the canister 100 may be fixed, regardless of the rotation of the fuel cap 200, when the canister 100 is inserted into the evaporation gas hose 30 preinstalled in the engine compartment, as described above. Therefore, the position of the fuel cap 200 separated from the auxiliary tank body 10 may be fixed by the canister 100, even when the fuel cap 200 is rotated and separated from the auxiliary tank body 10 for the supply of gasoline fuel. Thus, since the canister 100 and the quick connector 20, the positions of which are fixed, may be coupled to the fuel cap 200, the position of the fuel cap 200 may be fixed even after the separation of the fuel cap 200. Accordingly, it may be possible to prevent the separated fuel cap 200 from being misplaced due to falling to the outside of the vehicle or entering the engine compartment.

Figure 4:
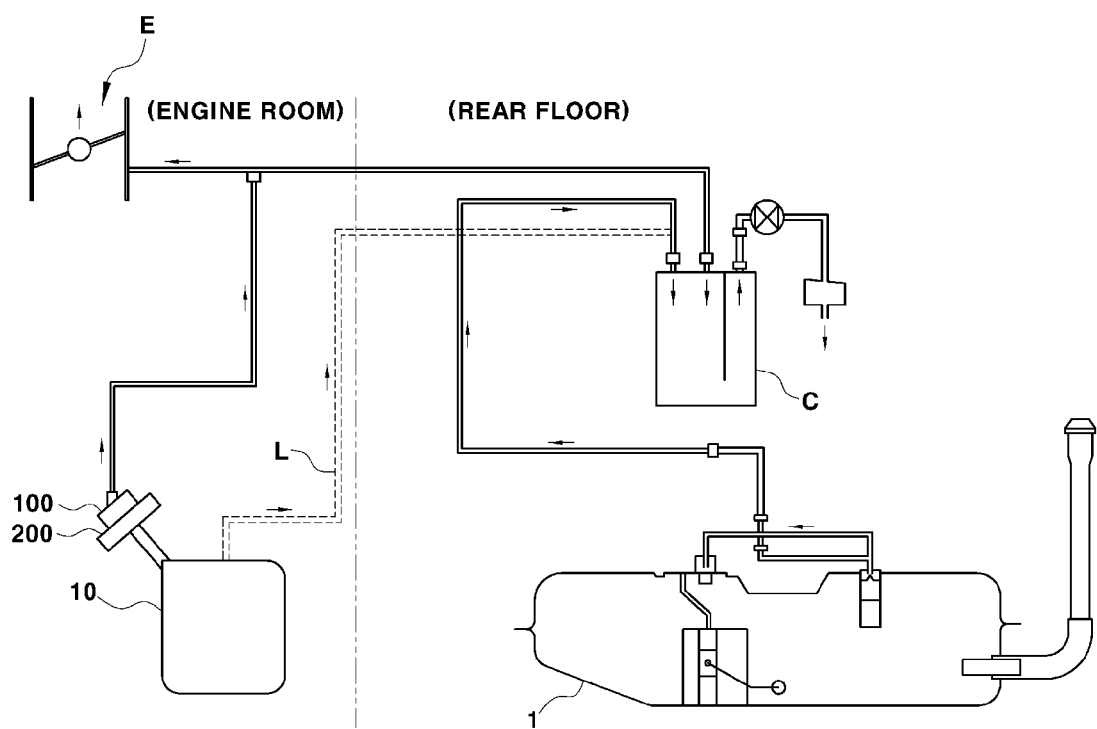
FIG. 4 is a diagram illustrating the flow of fuel evaporation gas in the auxiliary fuel tank for a flexible fuel vehicle according to the exemplary embodiment of the present invention.

FIG. 3 is a view illustrating a venting line in the auxiliary fuel tank for a flexible fuel vehicle according to the exemplary embodiment of the present invention. FIG. 4 is a diagram illustrating the flow of fuel evaporation gas in the auxiliary fuel tank for a flexible fuel vehicle according to the exemplary embodiment of the present invention. As illustrated in FIG. 3, the auxiliary fuel tank for a flexible fuel vehicle may obviate a conventional venting line L by installing the separate canister 100 to the auxiliary tank body 10, thereby reducing the manufacturing cost and weight of the vehicle.

In other words, since one canister C is installed to a main fuel tank 1 configured to store ethanol in a conventional flexible fuel vehicle, fuel evaporation gas generated in the auxiliary tank body 10 configured to store gasoline is moved to and collected in the canister C of the main fuel tank 1 disposed on the rear floor of the vehicle. Accordingly, since the number of paths of fuel evaporation gas moved to the canister C is increased in the related art, the manufacturing cost and weight of the vehicle may be increased, the installation workability thereof may be reduced, and safety in vehicle collision may be reduced.

However, according to an exemplary embodiment of the present invention, the canister 100 may also be installed to the auxiliary tank body 10, similar to the canister C installed to the main fuel tank 1. Accordingly, fuel evaporation gas generated in the auxiliary tank body 10 may be directly collected in the canister 100, and thus the above problem of the related art may be effectively resolved. Particularly, the fuel evaporation gas collected in the canister 100 may move to the engine. As illustrated in FIG. 4, the fuel evaporation gas collected in the canister C of the main fuel tank 1 may also move along a predetermined movement path to the engine E, together with the fuel evaporation gas discharged from the canister 100.

Accordingly, the present invention may reduce the manufacturing cost and weight of the vehicle by installing the canister, for collecting fuel evaporation gas generated in the auxiliary fuel tank, to the auxiliary fuel tank, thereby by obviating the venting line which passes through the engine compartment and the underbody of the rear floor. In addition, the present invention may collect fuel evaporation gas generated in the auxiliary fuel tank by mounting the compact canister to the fuel cap of the auxiliary fuel tank, thereby eliminating the smell of gasoline fuel stored in the auxiliary fuel tank. Furthermore, the present invention may prevent the fuel cap from being misplaced by independently applying a quick connector assembly structure for connecting the fuel cap to the canister having activated carbon therein.

The invention has been described in detail with reference to exemplary embodiments thereof. However, it will be appreciated by those skilled in the art that changes may be made in these exemplary embodiments without departing from the principles and spirit of the invention, the scope of which is defined in the appended claims and their equivalents.

What is claimed is:

1. An auxiliary fuel tank for a flexible fuel vehicle, mounted to an auxiliary tank body for storing gasoline fuel, and installed in an engine compartment of a flexible fuel vehicle, the auxiliary fuel tank comprising:
   a canister coupled to the auxiliary tank body, having activated carbon therein, and configured to collect fuel evaporation gas generated in the auxiliary tank body to supply fuel components to an engine.

2. The auxiliary fuel tank of claim 1, wherein the canister is integrally connected to an end of a quick connector when the quick connector is inserted and coupled into a fuel cap of the auxiliary tank body.

3. The auxiliary fuel tank of claim 2, wherein the quick connector is independently coupled to the fuel cap, and a position of the quick connector is fixed when the quick connector rotates for detachment/attachment of the fuel cap.

4. The auxiliary fuel tank of claim 2, wherein the quick connector is selectively separated from the fuel cap for maintenance of the canister.

5. The auxiliary fuel tank of claim 1, wherein an end of the canister, from which fuel evaporation gas is discharged, is fixedly inserted into an evaporation gas hose preinstalled in the engine compartment.

6. The auxiliary fuel tank of claim 5, wherein when both the quick connector and the canister are rotated with the fuel cap, an end of the canister inserted into the evaporation hose is separated from the evaporation gas hose by the rotational force thereof.

* * * * *